US011982253B2

(12) United States Patent
Hoffmann et al.

(10) Patent No.: US 11,982,253 B2

(45) Date of Patent: May 14, 2024

(54) FUEL INJECTOR

(71) Applicant: DELPHI AUTOMOTIVE SYSTEMS LUXEMBOURG S.A., Bascharage (LU)

(72) Inventors: Guy Hoffmann, Luxembourg (LU); Cas Breedijk, Kanfen (FR)

(73) Assignee: PHINIA Delphi Luxembourg SARL, Belvaux (LU)

( * ) Notice: Subject to any disclaimer, the term of this patent is extended or adjusted under 35 U.S.C. 154(b) by 376 days.

(21) Appl. No.: 17/265,052

(22) PCT Filed: Jul. 19, 2019

(86) PCT No.: PCT/EP2019/069466

§ 371 (c)(1),
(2) Date: Feb. 1, 2021

(87) PCT Pub. No.: WO2020/025354

PCT Pub. Date: Feb. 6, 2020

(65) Prior Publication Data

US 2021/0310455 A1 Oct. 7, 2021

(30) Foreign Application Priority Data

Aug. 1, 2018 (GB) ..................................... 1812530

(51) Int. Cl.

*F02M 61/18* (2006.01)
*F02M 51/06* (2006.01)
*F02M 61/20* (2006.01)

(52) U.S. Cl.

CPC ........ *F02M 61/18* (2013.01); *F02M 51/0671* (2013.01); *F02M 61/20* (2013.01)

(58) Field of Classification Search

CPC .... F02M 51/0671; F02M 61/18; F02M 61/20; F02M 51/0603; F02M 51/0621; F02M 51/0692; F02M 2200/02

USPC ....................................................... 239/585.5

See application file for complete search history.

(56) References Cited

U.S. PATENT DOCUMENTS

| | | | | |
|---|---|---|---|---|
| 4,813,599 | A * | 3/1989 | Greiner .............. | F02M 51/0692 239/456 |
| 6,420,817 | B1 | 7/2002 | Ricci-Ottati et al. | |
| 8,646,704 | B2 | 2/2014 | Yamamoto et al. | |
| 9,291,135 | B2 * | 3/2016 | Ohwada ............. | F02M 51/0671 |

(Continued)

*Primary Examiner* — Christopher R Dandridge

(74) *Attorney, Agent, or Firm* — Warner Norcross + Judd LLP

(57) ABSTRACT

A fuel injector includes a housing extending along an injector axis. A pintle has an axially extending pintle shaft and a radially projecting annular collar with a collar surface, the pintle being axially moveable between an open position and a closed position. An armature is axially guided in the housing between a proximal position and a distal position, the armature having an axial through-hole in which the pintle shaft is guided and an armature surface which engages the collar surface, thereby moving the pintle into the open position when the armature moves to the proximal position. A first resilient member biases the pintle in the distal direction and a second resilient member biases the armature in the distal direction. The armature surface and the collar surface are slanted with respect to the injector axis and one of the armature surface and the collar surface is convex curved.

10 Claims, 3 Drawing Sheets

(56) References Cited

U.S. PATENT DOCUMENTS

| | | | | |
|---|---|---|---|---|
| 9,885,328 | B2 * | 2/2018 | Matsukawa | F02M 51/0685 |
| 2008/0011886 | A1 | 1/2008 | Abe et al. | |
| 2011/0057059 | A1 * | 3/2011 | Yamamoto | F02M 61/12<br>239/584 |
| 2018/0080420 | A1 * | 3/2018 | Yamamoto | F02M 61/10 |
| 2018/0252192 | A1 | 9/2018 | Sugaya et al. | |

* cited by examiner

FUEL INJECTOR

CROSS REFERENCE TO RELATED APPLICATIONS

This application is a national stage application under 35 USC 371 of PCT Application No. PCT/EP2019/069466 having an international filing date of Jul. 19, 2019, which is designated in the United States and which claimed the benefit of GB Patent Application No. 1812530.2 filed on Aug. 1, 2018, the entire disclosures of each are hereby incorporated by reference in their entirety.

TECHNICAL FIELD

The present invention generally relates to internal combustion engines and more specifically to fuel injectors for such engines.

BACKGROUND ART

Fuel injectors are used in combustion engines to inject fuel e.g. into a runner of an air intake manifold ahead of a cylinder intake valve or directly into the combustion chamber of an engine cylinder. According to one known design, a pintle and an armature are disposed within an injector housing. The pintle is reciprocally movable between a closed position, in which it (or a ball that is fixed to the pintle) closes a nozzle seat upstream of spray orifices at one end of the injector housing (nozzle tip), and an open position, in which it is moved away from the nozzle seat, thereby enabling fuel injection. The pintle traverses a through-hole in the armature, and the armature is movable within the injector housing. In order to open the injector nozzle, a magnetic field is generated that acts on the armature to move it the opening direction of the pintle. For this purpose, the armature in turn has a surface that engages a corresponding surface of the pintle, typically on a protruding annular collar referred to as pintle collar or perch. A force is transferred from the armature to the pintle which moves the pintle away from the nozzle. Commonly, a spring is disposed to bias the pintle towards the nozzle.

In order to allow for proper axial movement of the armature and the pintle within the injector housing, it is known that the armature is guided within the housing and the pintle in turn is guided within the through-hole of the armature. In other words, the pintle is not guided directly within the housing, but indirectly via the armature. This concept, known as armature guided, requires a tight fit with low tolerances between the armature and the injector housing as well as between the pintle and the armature. Also, this concept is highly sensitive to any misalignment between the different parts of the fuel injector. For example, if the armature and the pintle are not aligned coaxially, but e.g. the armature is tilted with respect to the pintle, the contact between the armature surface and the pintle surface is impaired. Normally, the armature surface is flat and perpendicular to the actual direction. The pintle surface can be flat or slightly tapered. Either way, if the alignment is perfect, there is a two-dimensional, normally annular contact area between the armature surface and the pintle surface. If, however, the armature is tilted with respect to the pintle, there is basically only one contact point (i.e. a zero-dimensional contact area), which leads to intense stress and wear for the armature and/or the pintle, which reduces the lifetime of the fuel injector.

U.S. Pat. No. 8,646,704 discloses a fuel injector comprising a housing, a fixed core, a movable armature, a valve member. The valve member includes a shaft-shaped portion and a stopper portion, which contacts the movable core and has a stopper inclined surface. An outer peripheral surface of the shaft-shaped portion and an inner peripheral surface of an insertion hole of the movable armature define an inner clearance therebetween. The stopper inclined surface inclines radially inward of the shaft-shaped portion axially toward the nozzle hole. An axial clearance is formed between the stopper inclined surface and the movable core radially outward of a contact portion between the stopper inclined surface and the movable core. The valve member is pressed by a first resilient member toward the nozzle tip, i.e. in closed position. The armature is biased in opposite direction by a second resilient member. In other words, this injector design promotes, by way of the opposite springs, a permanent contact between the stopper and armature.

Technical Problem

It is thus an object of the present invention to provide a fuel injector in which alignment of the individual parts is less critical.

General Description of the Invention

The invention provides a fuel injector for an internal combustion engine, in particular a gasoline engine.

The fuel injector comprises a housing extending along an injector axis from a proximal end to a distal end and having a nozzle at the distal end. One main function of the housing is to contain and guide fuel before it is ejected from the injector. Therefore, a central cavity or bore is normally disposed inside the housing that extends at least mostly along the injector axis. Usually, the housing comprises a plurality of pieces or components that are stationarily connected with each other. The housing has a nozzle (or nozzle valve) for ejecting the fuel, which nozzle is disposed at a distal end and comprises a nozzle tip with one or more orifices for spraying fuel. The terms “distal” as well as “proximal” refer to the general flow direction of the fuel within the injector towards the distal end. In general, the distal end is the end of the injector that is closer to the nozzle and the proximal and is the end that is further away. The injector extends along an injector axis from the proximal and to the distal end. At least some parts of the injector can be symmetric with respect to the injector axis, but in general this injector axis only defines a reference frame, whereby an axial direction, a radial direction and a tangential direction are implicitly defined.

The injector further comprises a pintle having an axially extending pintle shaft and a radially projecting annular collar with a collar surface, the pintle being axially movable between an open position and a closed position. The pintle shaft is normally cylindrical and elongate, with a length of the pintle shaft corresponding to e.g. more than 10 times its diameter. In some embodiments, a ball is fixed to a distal end of the pintle. The ball may also be considered as a part of the pintle. In the closed position, the pintle (or the ball, respectively) closes the nozzle and prevents fuel from being ejected. In a typical embodiment, the ball engages a nozzle seat (upstream the spraying orifice(s)) at the distal end of the housing, thereby closing the nozzle. By axially moving the pintle towards the proximal end, it can be moved to an open position in which the nozzle is open and fuel can be sprayed out. The pintle collar is fixed relative to the pintle shaft. The pintle shaft and the pintle collar are preferably formed in one piece. At least, the pintle collar is axially fixedly mounted to the pintle shaft. The pintle collar comprises a collar surface, which is normally disposed on a distal side of the pintle collar.

The fuel injector further comprises an armature that is axially guided in the housing between a proximal position and a distal position, the armature having an axial through-hole in which the pintle shaft is guided and an armature surface adapted to engage the collar surface to transfer an axial force to move the pintle into the open position when the armature moves to the proximal position. In other words, the armature is guided in the housing along the injector axis so that it is movable along the injector axis between the proximal position and the distal position. Here and in the following, "along the injector axis" particularly, but not exclusively, means "parallel to the injector axis". More generally, it means "at least partially in the direction of the injector axis". The moving principle of the armature is not limited within the scope of the invention, but normally the armature is moved to the proximal position by a magnetic field, while it is moved to the distal position by spring force, wherein at least one movement could be assisted by fuel pressure. The fuel injector normally comprises a magnetic coil or solenoid for generating a magnetic field to move the armature to the proximal position. The magnetic coil may be e.g. circumferentially disposed around the injector axis. As a current flows through the magnetic coil, a magnetic field is generated, which may be enhanced and/or shaped by a pole piece. The pole piece may as well be disposed circumferentially around the injector axis, e.g. concentrically inside the magnetic coil, and may have an annular shape.

The armature has an axial through-hole in which the pintle shaft is guided. The shape of the through-hole is of course adapted for guiding the pintle shaft, wherefore the cross-section of the through-hole is normally circular, corresponding to a circular cross-section of the pintle shaft. The inner dimension (e.g. inner diameter) of the through-hole is slightly larger than the outer dimension (e.g. outer diameter) of the pintle shaft, although the difference is normally e.g. in the range of a few micrometers or tens of micrometers. The pintle shaft is guided in the through-hole and the armature is guided in the housing, whereby the pintle is indirectly guided in the housing via the armature. Radially outside of the through-hole, the armature usually comprises at least one fuel channel that traverses the armature.

The armature further has an armature surface that is adapted to engage the collar surface to transfer axial force to move the pintle into the open position when the armature moves to the proximal position. It is understood that in order to provide such a force transfer, the collar surface and the armature surface (or at least portions thereof) need to be disposed opposite each other along the injector axis, with the pintle surface being disposed proximal with respect to the armature surface. As the armature surface engages the collar surface, the proximal movement of the armature is transferred to the pintle.

According to the invention, the armature surface and the collar surface are slanted with respect to the injector axis and one of the armature surface and the collar surface is convex curved. In this context, "slanted with respect to the injector axis" means that the respective surface is neither parallel nor perpendicular to the injector axis. In other words, the angle between the surface and the injector axis is greater than 0° but smaller than 90°. Normally, the angle is between 30° and 75°, and more particularly between 45° and 60°. In general, this angle does not need to be constant, but can depend on the location on the respective surface. Normally, the armature surface faces radially inwards and proximal, while the collar surface faces radially outwards and distal. It is understood that the armature surface and the collar surface are only those parts of the total surface of the pintle and the armature, respectively, that are adapted to engage each other. Other parts of the total surface may be, e.g., parallel or perpendicular to the injector axis. Preferably, the armature surface is formed in such a way that a funnel-like structure is formed at the inlet of the axial through hole, in which the pintle collar with its collar surface is guided. Corresponding to the funnel-like structure, the collar perch can be tapering towards the distal direction.

One of the collar surface and the armature surface is convex curved. More specifically, the shape of the respective surface is convex curved as a function of a coordinate along the injector axis. One might also say that the respective surface is convex curved with regard to a plane that is parallel to the injector axis. To be specific, the surface is convex curved as viewed from the other surface, i.e. it bulges towards the other surface. Due to the convex curved shape, the contact area between the collar surface and the armature surface can be extensive, normally at least one-dimensional or even two-dimensional, even if there is a slight misalignment between the armature and the pintle. By the inventive configuration, the armature surface and the collar surface are parts of a joint or hinge that allows for positional changes, in particular tilting of the armature with respect to the pintle, while maintaining an extended contact area as opposed to a single contact point. It shall thus be appreciated that by the inventive configuration, a determined (isostatic) guide of the pintle within the armature is achieved. The convex curved surface always maintains contact—during opening—with the other surface with a region that is closest to the other surface. In general, it depends on the relative position of the pintle and the armature where this region is located. Since the alignment between the pintle and the armature and the alignment between the armature and the housing does not need to be as exact as with concepts known in the art, the tolerances for the inner and outer dimensions, respectively, of the housing, the armature and the pintle can be higher, which facilitates the production process and can lead to cost reductions. Moreover, stress and wear associated with a point contact between the armature and the pintle are avoided, whereby the lifetime of the fuel injector is increased.

Preferably, the collar surface is convex curved. In other words, the collar surface bulges towards the armature surface. As will be discussed below, this may be combined with various shapes of the armature surface.

In particular, the collar surface may be spherical. In other words, the collar surface corresponds to a portion of a surface of a sphere and therefore can be characterised by a single radius. With this configuration, the pintle and the armature may be considered as part of a ball joint. Under ideal conditions, the pintle would be able to freely tilt about the centre of the (imaginary) sphere while maintaining a contact area of constant shape and size between the collar surface and the armature surface.

Alternatively or additionally, the armature surface can be convex curved. In other words, the armature surface bulges towards the collar surface. This explicitly includes the possibility that both surfaces are convex curved.

Irrespective of which surface is convex curved, the other surface may in particular be conical. In this context, "conical" explicitly includes frusto-conical. As viewed in a plane parallel to the injector axis, the respective surface is neither concave nor convex curved, but straight. If the collar surface is convex curved, the armature surface delimits a conical space in which at least a portion of the pintle collar is received. If the armature surface is convex curved, at least a portion of the pintle collar is conical.

It is also possible that the other surface is concave curved. In this context, a curvature of the concave curved surface is normally less than a curvature of the convex curved surface. It is understood that the curvature of the concave curved surface cannot be greater, and if both curvature is are identical, this would necessitate extremely low production tolerances. If the collar surface is convex curved and the armature surface is concave curved, this corresponds to the most common and well-known configuration of a ball joint.

In general, it is within the scope of the invention that at least one of the surfaces is not continuous, but consists e.g. of several portions that are spaced along the tangential direction. However, this would mostly lead to a reduced contact area and therefore an increased local pressure and stress. Therefore, it is preferred that least one of the collar surface and the armature surface—preferably both surfaces—extends annularly along a tangential direction. Normally, both surfaces are rotationally symmetric about the injector axis.

Preferably, the armature surface is disposed at a proximal end of the through-hole. In particular, the space to be limited by the armature surface may be regarded as an extension of the through-hole that widens towards the proximal side, while the pintle shaft is guided in the through-hole, which has a smaller, constant cross-section.

As explained above, the inventive concept allows for a certain amount of tilting or misalignment between the armature and the pintle. Therefore, it is not necessary to guide the pintle within the armature along a larger length like in designs known in the art. In other words, the length of the through-hole can be relatively small. In particular, an axial length of the through-hole can be less than 150%, and even less than 100 or less than 50% of its diameter.

A first resilient member is provided in the housing to bias the pintle in distal direction. The first resilient member may be a first spring bearing at one end on the pintle collar and disposed on the proximal side thereof. For example, the first spring is disposed between the housing and the pintle collar to distally bias the pintle. "Bias distally" in this context means that a biasing force is exerted in the distal direction. The first spring is normally a coil spring that is arranged coaxially with the pintle and may e.g. surround a portion of the pintle shaft on a proximal side of the pintle collar. The function of the first spring is to keep the pintle collar in contact with the armature and to bring the distal end of the pintle into contact with the nozzle seat. In other words, the armature has to counteract and overcome the force of the first spring to move the pintle away from the nozzle seat.

Also, a second resilient member is provided to bias the armature in distal direction. The second resilient member may be a second spring bearing at one end on the armature and disposed on the proximal side thereof. For example, a second spring can be disposed between a pole piece of the housing and the armature to distally bias the armature.

The first and second springs may be concentrically arranged and preferably bear, at their respective opposite ends, on respective fixed injector parts.

Preferably, in the closed position, an annular gap separates the armature surface and the collar surface. This annular gap is obtained by design, providing an axial spacing between the armature and pintle collar in closed position. Since armature and pintle are both distally biased by their respective springs, i.e. pushed in closed position, they are not in contact in closed position, or more precisely the armature surface and the collar surface are not in contact. The contact armature/pintle will exist during an injection event, when the armature is attracted by the injector actuator to lift off the pintle. As explained above, the configuration of the cooperating slanted armature and collar surfaces permits an annular contact area that avoids localized wear. It will further be appreciated that since the armature surface and the collar surface are only engaged during an injection event, representing between 1 and 5% of time of a combustion cycle, they are most of the time not in contact, thus further reducing possibilities of mechanical wear between these surfaces, and thus enhancing injector lifetime.

The pole piece is adapted to enhance and/or shape a magnetic field that attracts the armature towards the proximal position. As mentioned above, the magnetic field is normally generated by a magnetic coil. The pole piece may be regarded as a part of the housing or as a separate element. Either way, it is mounted in a fixed position with respect to the housing. The second spring is also normally a coil spring that is arranged coaxially with the pintle and the first spring. In particular, it may be disposed radially outside of the first spring.

According to one embodiment, the armature comprises a circumferential flange that extends distally along the injector axis and has a first armature stop surface that engages a housing stop surface of the housing when the armature is in the distal position. The circumferential flange may be disposed around a volume through which fuel is guided. Normally, the first armature stop surface is disposed at a distal rim of the flange. By the engaging of the armature stop surface and the housing stop surface, any distal movement of the armature is limited. In particular, a force acting between the first armature stop surface and the housing stop surface may counteract any force acting on the armature by the second spring.

In order to limit a proximal movement of the armature with respect to the housing, the armature may comprise a second armature stop surface that engages a pole stop surface of the pole piece when the armature is in the proximal position. The pole piece as well as the second armature stop surface may be annular.

BRIEF DESCRIPTION OF THE DRAWINGS

Preferred embodiments of the invention will now be described, by way of example, with reference to the accompanying drawings, in which.

DESCRIPTION OF PREFERRED EMBODIMENTS

In the following description, the terms above, below, upper, lower, horizontal, vertical are not only used (in a non-limiting way) with reference to the orientation of the drawings, but also in consideration to the usual understanding of those skilled in the art.

Figure 1:
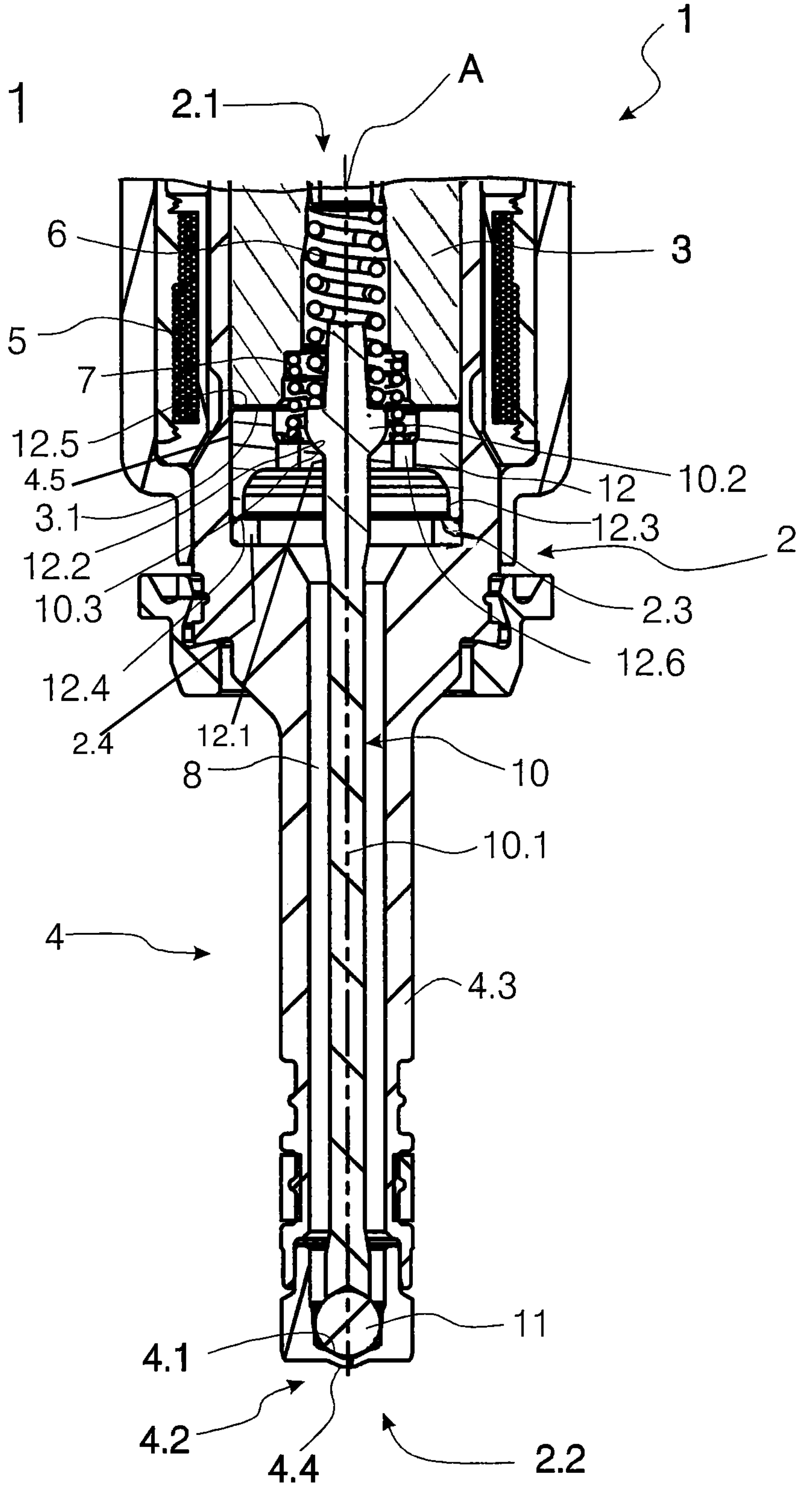
FIG. 1 is a cross-sectional view of a first embodiment of an inventive fuel injector.

FIG. 1 schematically shows an inventive fuel injector 1, which can be used in an internal combustion engine. The fuel injector 1 comprises a housing 2 consisting of several parts which are not explained here in detail. The housing 1 extends along an injector axis A from a proximal end 2.1 (i.e. upper end) to a distal end 2.2 (i.e. lower end), where a nozzle 4 ends with a tip 4.2. A cavity 8 is formed inside the housing 1, which extends along the nozzle 4 and is adapted for guiding fuel through the fuel injector 1.

A pintle 10 is disposed within the housing 2, and specifically within a nozzle body 4.3, in order to control the spraying of fuel at the distal, nozzle tip 4.2. The pintle 10 has an axially extending, elongate pintle shaft 10.1, from which an annular collar 10.2 projects radially. The annular collar 10.2, which may also be referred to as pintle perch, forms a protruding stop member that is here in one piece with the pintle shaft 10.1, but could alternatively be a separate piece fixed thereto.

The pintle 10 is axially movable between an open position (not shown) and a closed position, which is represented in FIG. 1. In the closed position, a ball 11 at a distal end of the pintle 10 rests against a nozzle seat 4.1 of the nozzle 4, whereby the nozzle 4 is closed. The nozzle seat 4.1 is located at the nozzle tip 4.2, upstream from one or more flow orifices 4.4. If the pintle 10 moves proximally towards the open position, the ball 11 is lifted away from the nozzle seat 4.1, whereby the nozzle 4 is opened. A first spring 6 is disposed between the housing and the pintle collar 10.2. It is a coil spring that is aligned along the injector axis A and exerts a force to distally bias the pintle 10, i.e. to bias the pintle 10 in a distal direction (onto the nozzle seat 4.1).

Above the pintle 10, at the proximal end 2.1, one will recognize the actuator assembly that is only partially shown. Contained inside the housing, actuator assembly includes an annular pole piece 3 coaxially arranged with respect to axis A and surrounding the proximal pintle end, and a coil 5 surrounding the pole piece 3. Fuel is introduced in the injector at the proximal end 2.1 and flows through the actuator assembly into cavity 8 down to the nozzle tip region.

The fuel injector 1 further comprises an armature 12 that has a roughly annular shape and surrounds the pintle 10. The armature 12 has an axial, central through-hole 12.1 in which the pintle shaft 10.1 is guided, i.e. the pintle shaft 10.1 can move axially in the through-hole 12.1, but radial movement with respect to the armature 12 is greatly limited. The inner cross-section of the through-hole 12.1 is adapted to the outer cross-section of the pintle shaft 10.1, both of which are circular. Radially outside with respect to the through-hole 12.1, the armature 12 comprises a plurality of fuel channels 12.6 that communicate with the cavity 8 in order to allow passage of fuel through the armature 12. The armature 12 is arranged in the nozzle body 4.3 in a cylindrical bore 4.5. The armature 12 is further axially guided in the nozzle body 4.3 between a first, proximal position and a second, distal position. In the distal position, which is shown in FIG. 1, a first armature stop surface 12.4 rests against a bottom shoulder forming a stop surface 2.3 in the nozzle body 4.3. In the present case, the stop surface 2.3 is in fact the upper surface of a non-magnetic ring 2.4 that is disposed on the bottom of cylindrical bore 4.5; such ring is conventionally provided to avoid magnetic sticking of the armature. The first armature stop surface 12.4 is disposed at a distal rim of an annular flange 12.3 of the armature 12 that extends distally parallel to the injector axis A.

In the proximal position of the armature 12, which is not shown in the figures, a second armature stop surface 12.5 on a proximal side of the armature 12 engages a pole surface 3.1 of the pole piece 3. As is known, the pole piece 3 is adapted to enhance and/or shape a magnetic field that is generated by the magnetic coil 5. If a current flows through the magnetic coil 5, a magnetic field is generated and enhanced by the pole piece 3, whereby the armature 12 is pulled towards the pole piece 3 into the proximal position. A second spring 7 is disposed between the housing 2, or more specifically, the pole piece 3, and the armature 12 to distally bias (downwardly) the armature 12. As long as no magnetic field is acting on the armature 12, it is kept in the distal position by the second spring 7.

The armature also comprises an armature surface 12.2 that is adapted to engage a collar surface 10.3 of the pintle collar 10.2. The armature surface 12.2, which is disposed at a proximal end of the through-hole 12.1, is adapted to transfer an axial force to move the pintle 10 into the open position when the armature 12 moves to the proximal position. In other words, the pintle 10 is moved by the armature 12, which in turn is moved by the magnetic field, wherein the force between the armature 12 and the pintle 10 is transferred via the armature surface 12.2 and the collar surface 10.3. Normally, the pintle 10 is moved by a combination of the force exerted by the armature 12 and pressure exerted by fuel in the fuel injector 1. In the embodiment shown in FIGS. 1, 2 and 5, both the armature surface 12.2 and the collar surface 10.3 extend annularly along a tangential direction and are slanted—i.e. neither parallel nor perpendicular—with respect to the injector axis A. More specifically, the collar surface 10.3 is spherical and the armature surface 12.2 is conical.

Figure 5:
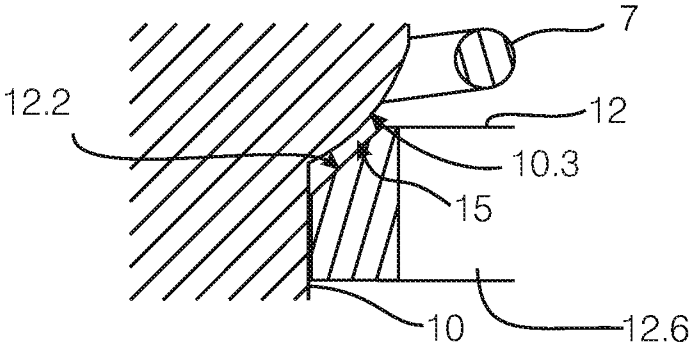
FIG. 5 is a detail view showing the pintle-armature interface in closed position for the injector of FIG. 1.

It may be noted that in the closed position, corresponding to FIGS. 1 and 5, the armature surface 12.2 and the collar surface 10.3 are not in contact; they are spaced by an annular gap 15. As indicated above, in the closed position the armature 12 rests on the non-magnetic ring 2.4. The armature is biased in this closed position by spring 7. Likewise, the pintle is biased in closed position by spring 6 (so that the pintle tip or ball 11 rests on the nozzle seat 4.1). The injector is configured so that in the closed position, there is an axial spacing between the pintle collar 10.2 and the armature 12 resting on ring 2.4. This axial spacing results in the annular gap 15 separating the facing armature surface 12.2 and the collar surface 10.3, as can be observed in FIG. 5. In the present embodiment, the length of the axial spacing, respectively annular gap, can be adjusted during injector assembly, in particular by adjusting the position of the nozzle tip part 4.6 comprising the seat 4.1. As can be seen, the nozzle tip is a separate part fitted at the distal end of the nozzle body. Once the nozzle tip 4.6 has been inserted in the nozzle body 4.3 to the desired depth, to control the desired annular gap 15, the nozzle tip 4.6 is welded.

The present configuration is advantageous in that it limits the pintle/armature contact and hence reduces wear of the cooperating surfaces. When injector coil 5 is energized, the armature 12 takes off and moves upward alone over the distance of the axial spacing, and then impacts the pintle collar 10.2, whereby both the armature 12 and pintle 10 move upward. The armature's proximal displacement is limited by the pole piece 3. The impact of the armature 12 into the pintle collar 10.2 forces the pintle to open. The pintle 10 tends to undergo an overshoot but is brought back against the armature 12 by spring 6 in the open position, as long as the coil 5 is energized. The contact/pintle remains during the needle closing stroke. This because the armature 12 sees mechanical and hydraulic friction, but also because there is still some magnetic attraction towards the pole piece 3. Once the pintle 10 with ball 11 are contacting the seat 4.1, the armature 12 detaches from the pintle 10 and travels alone to the stop ring 2.4. The biasing spring 7 assists in pushing the armature towards the stop ring 2.4 and minimizes the number of bounces. Back in closed position, the armature and pintle collar are separated by annular gap 15. It should be observed here that thanks to the present configuration, the armature surface 12.2 and the collar surface 10.3 are in contact essentially during an injection event, but not in closed position. Taking into consideration the operation of an internal combustion engine, and having in particular regard to combustion cycles, it is estimated that the armature and pintle are in contact about 1 to 5% of the time. This hence limits contact, and thus wear, at contact surfaces, which is favorable for enhanced injector lifetime.

An axial length of the through-hole 12.1 is less than its diameter, i.e. the through-hole 12.1 is comparatively short, wherefore the pintle 10 is not stabilised against tilting with respect to the injector axis A as much as with a longer through-hole. However, even if some tilting or misalignment between the pintle 10 and the armature 12 occurs, the shape of the armature surface 12.2 and the collar surface 10.3 enable the pintle collar 10.2 to always stay in contact during opening with the armature surface 12.2 along an annular contact area 13 (see FIG. 2). Effectively, the collar surface 10.3 and the armature surface 12.2 can be considered as forming a ball link. Since the contact area 13 is always annular (as opposed to point-shaped, i.e. one-dimensional), the local stress and abrasion can be limited, thereby prolonging the service lifetime of the fuel injector 1.

Thinking in terms of degrees of freedom, one can say that in the distal (closed) position the armature has following constraints: Axial position frozen, by injector body stop surface and biasing spring pushing; Horizontal orientation frozen, by injector body stop surface and biasing spring pushing; Horizontal position frozen, by contact armature outer diameter and injector body inner diameter; Rotation around central axis A is possible.

Once the armature has left the stop surface 2.3, it has following constraints: Axial position: free=movement; Horizontal position and horizontal orientation frozen by contact between the armature outer diameter and the injector body internal diameter; Rotation around central axis possible.

When the armature is in contact with the pintle, the armature is free in axial direction (movement), its horizontal position and horizontal orientation are frozen by the contact between the armature outer diameter and the injector body inner diameter; the rotation around central axis A is possible. For the pintle, the axial position and horizontal position are frozen, by contact between the pintle sphere to armature cone and core spring pushing; the rotation around central axis A is possible, the horizontal orientation is free.

Figure 2:
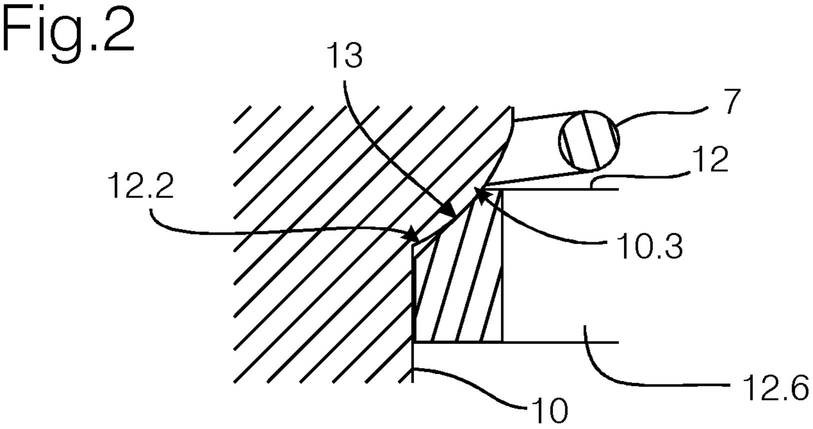
FIG. 2 is a detail view of the pintle-armature interface of FIG. 1, during opening of the injector.
Figure 3:
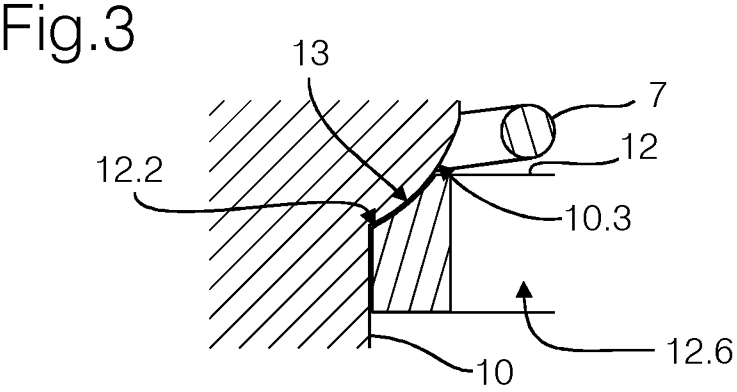
FIG. 3 is a detail view of the pintle-armature interface according to a second embodiment of an inventive fuel injector.

FIG. 3 shows a detailed view of a second embodiment, which is largely identical to the first embodiment shown in FIGS. 1 and 2. In this embodiment, however, the collar surface 10.3 is also convex curved, while the armature surface 12.2 is concave curved with a curvature that is less than the curvature of the collar surface 10.3. As compared to the first embodiment, the cooperation of the convex curved and the concave curved surface may help to increase the contact area 13, thereby further limiting local stress.

Figure 4:
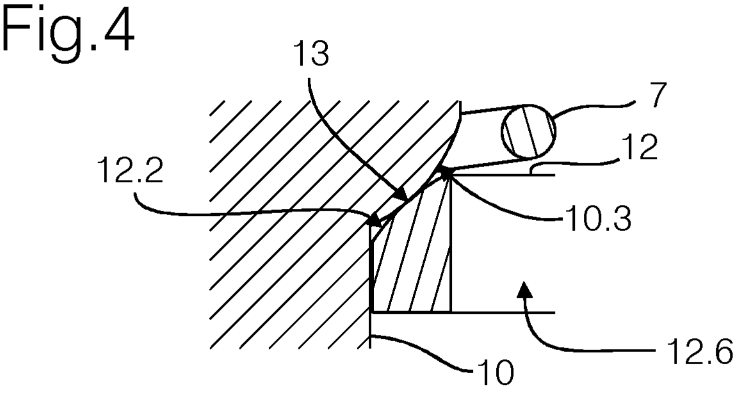
FIG. 4 is a detail view of the pintle-armature interface according to a third embodiment of an inventive fuel injector.

FIG. 4 is a detail view of a third embodiment, in which both the collar surface 10.3 and the armature surface 12.2 are convex curved.

The invention claimed is:

1. A fuel injector comprising:

a housing extending axially along an injector axis from a proximal end to a distal end and having a nozzle at the distal end, said nozzle ending by a nozzle tip from which fuel is sprayed;

a pintle having a pintle shaft which extends axially and also having an annular collar which projects radially from the pintle shaft, said annular collar having a collar surface, the pintle being axially movable between an open position and a closed position, thereby controlling flow of fuel at said nozzle tip; and an armature that is axially guided in the housing between a proximal position and a distal position, the armature having an axial through-hole therein in which the pintle shaft is guided and an armature surface which engages the collar surface, thereby transferring an axial force which moves the pintle into the open position when the armature moves to the proximal position;

the armature further including a plurality of fuel channels that are disposed radially outside with respect to the through-hole;

wherein a first resilient member is provided which biases the pintle toward the distal end;

wherein a second resilient member is provided which biases the armature toward the distal end;

wherein the armature surface and the collar surface are slanted with respect to the injector axis; and wherein the collar surface and the armature surface that engages the collar surface are both convex curved such that the collar surface has an arcuate protrusion that arcuately protrudes outwardly, the armature surface has an arcuate protrusion that arcuately protrudes outwardly, wherein the arcuate protrusion of the collar surface and the arcuate protrusion of the armature surface are spherical such that each corresponds to a portion of a surface of a sphere, wherein the arcuate protrusion of the armature surface extends from the through-hole to the fuel channels, and wherein the arcuate protrusion of the armature surface and the arcuate protrusion of the collar surface engage one another.

2. The fuel injector according to claim 1, wherein the first resilient member is a first spring bearing at one end on the annular collar and disposed on a side of the annular collar which faces toward the proximal end.

3. The fuel injector according to claim 2, wherein the second resilient member is a second spring bearing at one end on the armature and disposed a side of the armature which faces toward the proximal end.

4. The fuel injector according to claim 3, wherein the first spring and the second spring are concentrically arranged and bear, at their respective opposite ends, on respective fixed injector parts.

5. The fuel injector according to claim 1, wherein, in the closed position, an annular gap separates the armature surface and the collar surface.

6. The fuel injector according to claim 1, wherein the collar surface is spherical.

7. The fuel injector according to claim 1, wherein at least one of the collar surface and the armature surface extends annularly along a tangential direction.

8. The fuel injector according to claim 1, wherein the armature surface is disposed at a proximal end of the through-hole.

9. The fuel injector according to claim 1, wherein an axial length of the through-hole is less than 200% of its diameter.

10. The fuel injector according to claim 1, wherein the armature comprises a circumferential flange that extends distally along the injector axis and has a first armature stop surface that engages a stop surface in the housing when the armature is moved toward the distal end; and/or the armature comprises a second armature stop surface that engages a pole stop surface of the pole piece when the armature is moved toward the proximal position.

* * * * *